United States Patent
Morris

(10) Patent No.: US 6,405,993 B1
(45) Date of Patent: Jun. 18, 2002

(54) LENS MOULD

(75) Inventor: Andrew Paul Morris, Lincolnshire (GB)

(73) Assignee: Ocular Sciences, Inc., Concord, CA (US)

( * ) Notice: Subject to any disclaimer, the term of this patent is extended or adjusted under 35 U.S.C. 154(b) by 0 days.

(21) Appl. No.: 09/531,130

(22) Filed: Mar. 17, 2000

(30) Foreign Application Priority Data

Mar. 19, 1999 (GB) .............................................. 9906240

(51) Int. Cl.[7] .............................................. B29D 11/00
(52) U.S. Cl. ........................ 249/141; 249/160; 425/215; 425/808
(58) Field of Search ................................ 249/117, 141, 249/160; 425/215, 808, DIG. 58; 264/1.1, 2.3, 318

(56) References Cited

U.S. PATENT DOCUMENTS

| | | | | |
|---|---|---|---|---|
| 5,271,875 A | * | 12/1993 | Appleton et al. | 264/2.3 |
| 5,542,978 A | * | 8/1996 | Kindt-Larsen et al. | 118/256 |
| 5,574,554 A | * | 11/1996 | Su et al. | 356/124 |
| 5,578,332 A | * | 11/1996 | Hamilton et al. | 425/555 |
| 5,620,720 A | * | 4/1997 | Glick et al. | 425/408 |
| 5,975,875 A | * | 11/1999 | Crowe, Jr. et al. | 425/215 |

* cited by examiner

*Primary Examiner*—Nam Nguyen
*Assistant Examiner*—Donald Heckenberg
(74) *Attorney, Agent, or Firm*—Stout, Uxa, Buyan & Mullins, LLP; Frank J. Uxa

(57) ABSTRACT

A cast mould for use in the manufacture of a contact lens by the polymerisation of a flowable precursor comprises a female mould part and a male mould part. The female mould part has a concave first surface region adapted to receive the flowable precursor in use, and a second surface region. The male mould part has a convex first surface region and a second surface region. The male mould part is engageable with the female mould part to define a lens-forming recess between the concave and convex surface regions and to define a first overflow cavity between said second surface regions. The first overflow cavity is adapted to receive excess flowable precursor displaced from the lens-forming recess in use, and the first overflow cavity is provided with first retaining means such that, in use, after polymerisation, polymer in the first overflow cavity is mechanically interlocked with a single one of the mould parts after separation of the mould parts.

9 Claims, 1 Drawing Sheet

LENS MOULD

In the conventional process of soft hydrated contact lens manufacture, a key step is polymerisation of a liquid monomer in a cast mould. The mould comprises a male and a female mould part which, when engaged, form a lens-forming recess. Liquid monomer is poured into the female mould part before engagement of the male part with the female part. To ensure that the lens is correctly formed, the volume of liquid supplied is greater than the volume of the lens-forming recess. The excess liquid is displaced into an overflow cavity defined between the mould parts, the overflow cavity being disconnected from the lens-forming recess when the mould parts are fully engaged. The polymerisation results in a brittle lens (in the lens-forming recess) and a surrounding ring of brittle excess polymer known as "flash" (in the overflow cavity). Removal of the lens from the mould can result in the lens and flash ring becoming mutually electrostatically attracted. This is a problem during subsequent hydration of the lens when the flash ring can become adhered to the lens. The problem is exacerbated by the fact that removal of the lens from the mould often results in fragmentation of the flash ring. Contamination of lenses by small fragments of flash during hydration accounts for a significant proportion of wastage in the manufacture of contact lens.

It is an object of the present invention to provide an improved mould for use in the manufacture of a contact lens which obviates or mitigates the above-mentioned problem.

According to a first aspect of the present invention there is provided a cast mould for use in the manufacture of a contact lens by the polymerisation of a flowable precursor comprising:

(i) a female mould part having a concave first surface region adapted to receive the flowable precursor in use, and a second surface region; and (ii) a male mould part having a convex first surface region and a second surface region, the male mould part being engageable with the female mould part to define a lens-forming recess between the concave and convex surface regions and to define a first overflow cavity between said second surface regions, the first overflow cavity being adapted to receive excess flowable precursor displaced from the lens-forming recess in use; wherein the first overflow cavity is provided with first retaining means such that, in use, after polymerisation, polymer in the first overflow cavity is mechanically interlocked with a single one of the mould parts after separation of the mould parts.

Preferably, the first retaining means is integrally formed with the second surface region of one of the mould parts. More preferably, the first retaining means comprises at least one recess in the second surface region and/or at least one protrusion extending from the second surface region into the first overflow cavity in use.

Preferably, the first overflow cavity is annular and extends around the lens-forming recess, in which case said at least one recess is preferably an annular undercut in said second surface region and said at least one protrusion is preferably an annular rib.

Preferably, the first retaining means is provided in the second surface region of the female mould part.

Preferably, the male and female mould parts each have a third surface region which define a second overflow cavity therebetween when the parts are engaged, the second overflow cavity being adapted to receive, in use, any excess flowable precursor displaced from the first overflow cavity, said second overflow cavity being provided with second retaining means such that after polymerisation, polymer in the second overflow cavity is mechanically interlocked with a single one of the mould parts after separation of the mould parts.

More preferably, the first and second retaining means are formed in the second and third surface regions respectively of the same (most preferably female) mould part.

The present invention also resides in the use of the mould in a method of manufacture of a contact lens, preferably a soft hydrated contact lens.

An embodiment of the invention will now be described with reference to the accompanying drawings in which.

Figure 1:
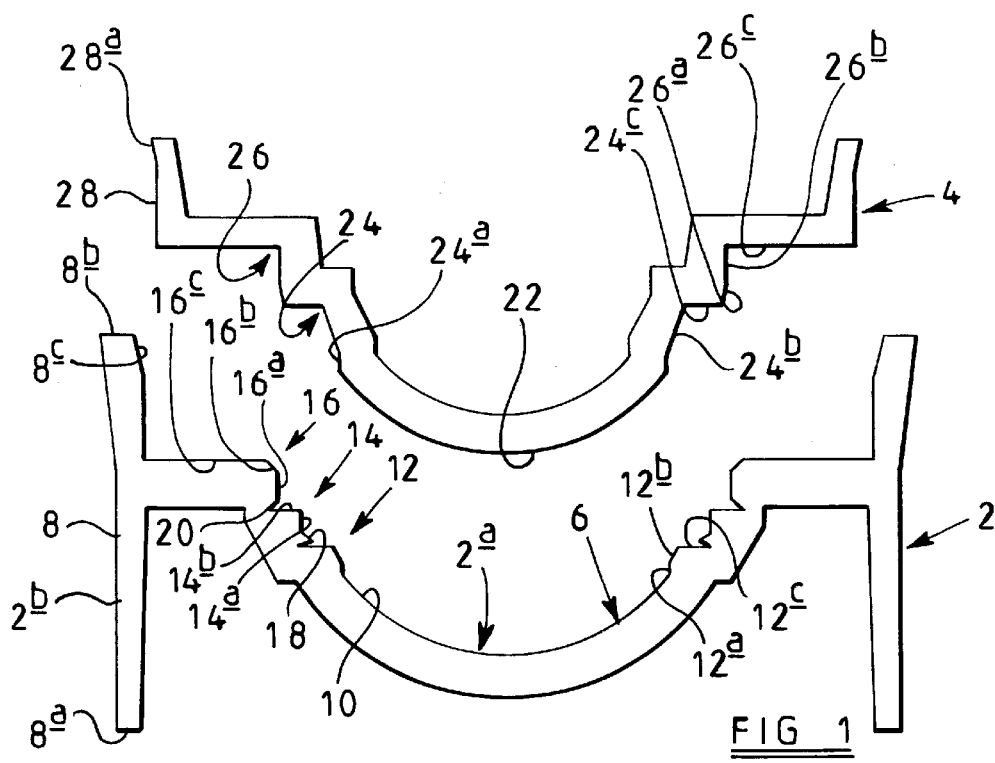
FIG. 1 shows a mould in accordance with the present invention.

Referring to the drawings, a female mould part 2 and a male mould part 4 are separately formed from polypropylene by injection moulding. The female mould part 2 has a moulding portion 2a and a support portion 2b. An upper (moulding) surface 6 of the moulding portion 2a engages, in use, with a corresponding lower (moulding) surface of the male part 4 (described below). The support portion 2b has a cylindrical wall 8 which surrounds the moulding portion 2a and which is joined at an intermediate region to the periphery of the moulding portion 2a. A first axial end 8a of the cylindrical wall 8 serves as a base for the female mould part 2. An opposite axial end 8b of the cylindrical wall 8 has a tapered inner surface 8c which helps guide the male mould part 4 in use.

The upper surface 6 of the moulding portion 2a has a part-spherical surface region 10 which is concave (the degree of curvature of a central portion of the surface region 10 being dependent upon the power of the lens to be moulded) and first, second and third contiguous stepped regions 12,14,16 disposed radially outwardly of the part-spherical surface region 10. The first stepped region 12 is defined by a first cylindrical surface region 12a, which defines the radial extent of the part-spherical surface region 10, a first frusto-conical surface region 12b and a first annular surface region 12c. The second stepped region 14 is defined by a second cylindrical surface region 14a (contiguous with the first annular surface region 12c of the first stepped region 12) and a second annular surface region 14b. The second cylindrical surface region 14a is provided with an inwardly projecting annular rib 18. The third stepped region 16 is defined by a third cylindrical surface region 16a (contiguous with the second annular surface region 14b of the second stepped region 14, a second frusto-conical surface region 16b and a third annular surface region 16c. The third cylindrical surface region 16a is undercut at its base to define an annular groove 20 between the third cylindrical surface region 16a and the second annular surface region 14b.

The male mould part 4 has a part-spherical convex lower surface region 22 and contiguous first and second stepped regions 24,26 disposed radially outwardly of the convex lower surface region 22. The first stepped region 24 is defined by a first cylindrical surface region 24a (which defines the radial extent of the convex surface region 22 and which corresponds to the radial extent of the concave surface region 10 of the female mould part 2), a first frusto-conical surface region 24b and a first annular surface region 24c. The second stepped region 26 is defined by a second frusto-conical surface region 26a (contiguous with the first annular surface region 24c of the first stepped region 24), a second cylindrical surface region 26b and a second annular surface region 26c. The periphery of the male mould part 4 is in the form of a cylindrical rib 28 which has an outwardly tapering outer surface region 28a at its free end corresponding to the tapered inner surface 8c of the cylindrical wall 8 of the female mould support portion 2b.

Figure 2:
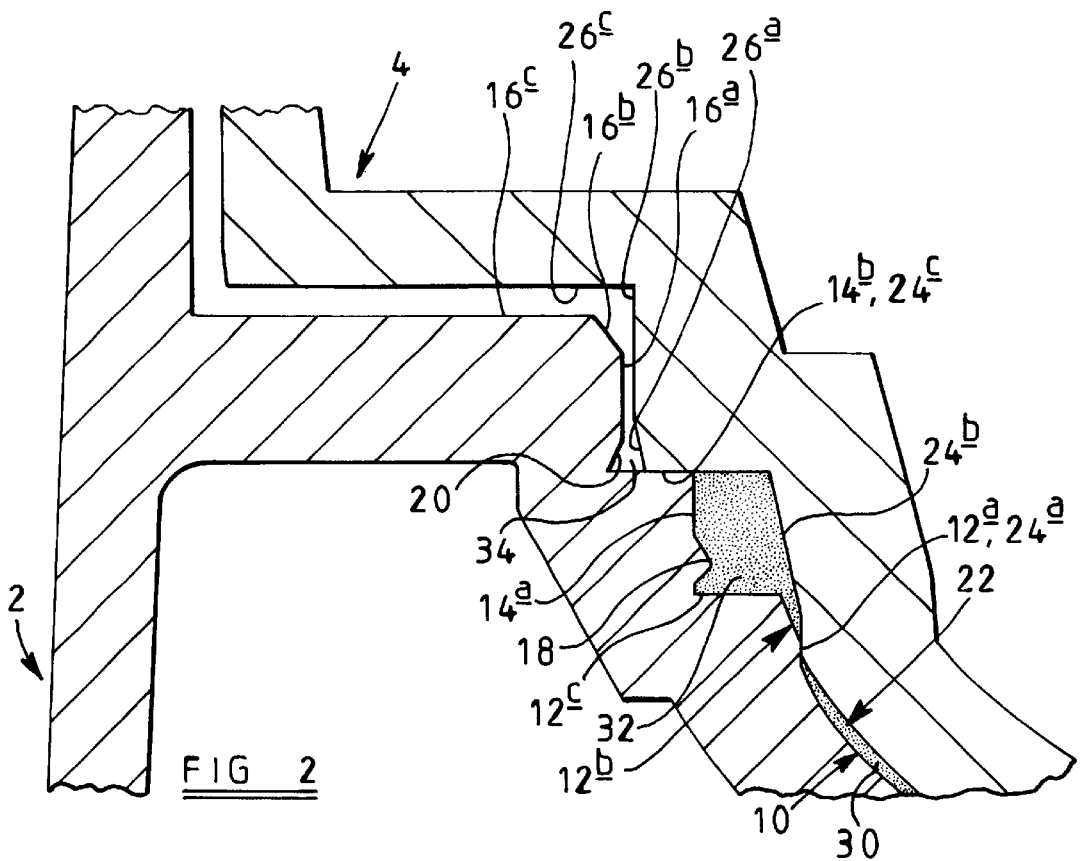
FIG. 2 shows in cross section a detail of the mould of FIG. 1.

Referring specifically to FIG. 2, when the male and female mould parts 2,4 are engaged, the concave surface region 10 of the female part 2 and the convex surface region 22 of the male part 4 define a lens-forming recess 30 (shown in part). The respective first cylindrical surface regions 12a,24a on the male and female parts 2,4 are an interference fit and define a sharp boundary for the lens-forming recess 30. The second annular surface region 14b of the female part 2 and the first annular surface region 24c of the male part 4 mutually abut and ensure correct axial registration of the mould parts 2,4. An enclosed first overflow cavity 32 is defined between the first annular surface region 12c and the second cylindrical surface region 14a of the female part 2, and part of the first cylindrical surface region 24a, the first frusto-conical surface region 24b and part of the first annular surface region 24c of the male part 4. A second overflow cavity 34 is defined between part of the second annular surface region 14b and the third cylindrical surface region 16a of the female part 2 and the second frusto-conical surface region 26a and the second cylindrical surface region 26b of the male part 4.

The above-described mould can be used to manufacture a soft hydrated contact lens, in which case, a liquid containing hydroxyethyl methacrylate (HEMA) and a polymerisation initiator is deposited into the concave surface region 10 of the female mould part 2. The volume of liquid deposited is greater than the volume of the lens-forming recess 30 to ensure that a complete lens is moulded. The male mould part 4 is then engaged with the female part 2, correct radial positioning being assisted by the tapered inner surface 8c of the cylindrical wall 8 and the first and second frusto-conical surface regions 12b,16b on the female part 2. The aforementioned parts (8c,16b,12b) of the female mould part 2 define a hierarchy of tapered guides which ensure that the upper and lower moulding surfaces 6,22 of the respective female and male parts 2,4 do not contact any part of the respective male or female part 4,2 when the two parts 2,4 are brought together, even if the two parts 2,4 are initially misaligned. Correct alignment during engagement of the parts 2,4 is ensured by the fact that the radial distance between the outer cylindrical surface of the cylindrical rib 28 and the radially innermost extent of the second frusto-conical region 26a of the male part 4 is at least as great as the radial distance between the cylindrical wall 8 and the radially outermost extent of the second frusto-conical surface region 16b of the female part 2. Such an arrangement ensures that, during engagement, it is not possible for the annular surface region 26c of the male part 4 to abut the third annular surface region 16c of the female part 2 even if the cylindrical wall 8 of the female part 2 is in contact with the rib 28 of the male part (maximum misalignment). Similarly, the radial distance between the first and second cylindrical surface regions 24a,26b of the male part 4 is at least as great as the the radial distance between the third cylindrical surface region 16a and the radially outermost extent of the first frusto-conical surface region 12b of the female part 2, so that it is not possible for the convex surface region 22 of the male part 4 to abut the first annular surface region 12c of the female part 2, even if the third cylindrical surface region 16a of the female part 2 and the second cylindrical surface region 26b of the male part 4 are in contact.

As the mould parts 2,4 are engaged, excess liquid is forced from the lens-forming recess 30 into the first overflow cavity 32, and if sufficient excess liquid is present (not shown in FIG. 2) liquid is forced from the first overflow cavity 32 into the second overflow cavity 34. Any liquid in the second overflow cavity 34 is initially drawn into the annular groove 20 by surface tension effects. Correct axial registration of the mould parts 2,4 is ensured by abutment of the second annular surface region 14b of the female part 2 with the first annular surface region 24c of the male part 4 (as shown in FIG. 2).

After heating, the HEMA polymerises to form a brittle polymer in the lens-forming recess 30 (the lens) and in the first overflow cavity 32 (the flash ring). Separation of the mould parts 2,4 is effected by inverting the mould and applying firm pressure to an underside of the female mould part 2 at the centre of the moulding portion 2a. The first and second frusto-conical surface regions 24b,26a on the male part 4 promote smooth separation of the mould parts 2,4 without breakage of the flash ring. The flash ring is prevented from being dislodged from the female part 2 by mechanical interlocking with the rib 18 projecting from the second cylindrical surface region 14a of the female part 2 which serves as a retaining member for the flash ring. The lens, however, remains temporarily attached to the convex surface region 22 of the male part 4. It will be understood that any flash in the second overflow cavity 34 will be mechanically interlocked with the groove 20 in the third cylindrical surface region 16a of the female part 2.

Once the male and female parts 2,4 are completely separated, the lens is removed from the male part 4 and submersed in a hydrating solution to give the lens its characteristic flexibility and "wet" feel. Since the flash is retained on the female part there is a much reduced risk of adherence of flash to the lens during the hydration step and wastage is therefore considerably reduced.

I claim:

1. A cast mold for use in the manufacture of a contact lens by the polymerization of a flowable precursor, the mold comprising:

a female mold part including a concave surface region adapted to receive the flowable precursor, a first flash retaining region. and a second flash retaining region;

a male mold part having a convex surface region, the male mold part being engagable with the female mold part to define a lens forming recess between the concave and convex surface regions;

a first overflow cavity located between the male mold part and the first flash retaining region; and a second overflow cavity located between the male mold part and the second flash retaining region;

wherein the female mold part is configured to retain a first flash portion within the first flash retaining region and to retain a second separate flash portion within the second flash retaining region, and the male mold part is configured to retain a contact lens product upon separation of the male mold part and the female mold part.

2. The mold of claim 1 wherein the first flash retaining region defines a substantially annular rib on the female mold part.

3. The mold of claim 1 wherein the second flash retaining region defines a substantially annular groove in the female mold part.

4. The mold of claim 1 wherein the first flash retaining region defines a substantially annular rib on the female mold part and the second flash retaining region defines a substantially annular groove in the female mold part.

5. A cast mold for use in the manufacture of a contact lens by the polymerization of a flowable precursor, the mold comprising:
- a female mold part having a concave surface region adapted to receive the flowable precursor, and a first overflow region including a first flash retaining element, and a second overflow region including a second flash retaining element; and
- a male mold part having a convex surface region, a first male overflow region, and a second male overflow region, wherein the male mold part is engagable with the female mold part to define:
  - a lens forming recess between the concave and convex surface regions, a first overflow cavity between the first overflow region and the first male overflow region, and a second overflow cavity between the second overflow region and the second male overflow region, wherein
  - the female mold part is configured to retain a first flash portion within the first overflow region and to retain a second separate flash portion within the second overflow region, and the male mold part is configured to retain a contact lens product upon separation of the male mold part and the female mold part.

6. The mold of claim 5 wherein the first flash retaining element has a different configuration than the second flash retaining element.

7. The mold of claim 5 wherein the first flash retaining element comprises a substantially annular rib.

8. The mold of claim 5 wherein the second flash retaining element defines a substantially annular groove.

9. The mold of claim 5 wherein the first flash retaining element comprises a substantially annular rib, and the second flash retaining element defines a substantially annular groove.

* * * * *